Figure 1:
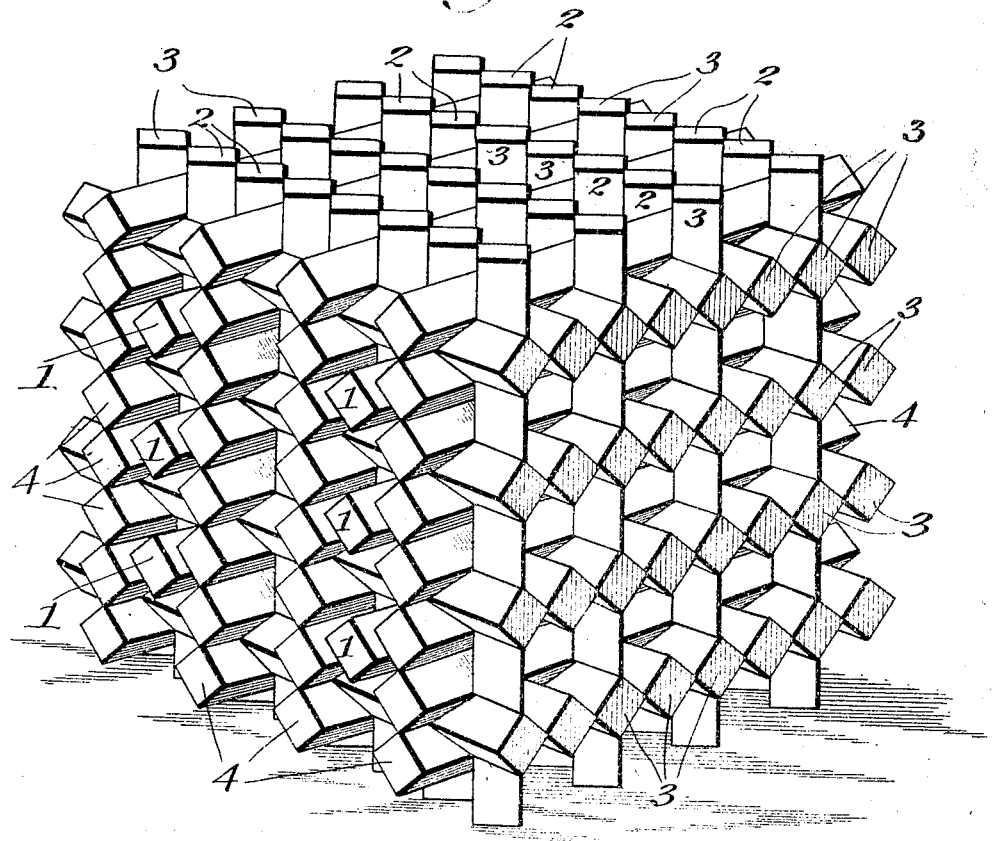

No. 774,197. PATENTED NOV. 8, 1904.
J. S. PINNELL.
PUZZLE.
APPLICATION FILED OCT. 9, 1902.
NO MODEL. 2 SHEETS—SHEET 1.

WITNESSES:

INVENTOR
John S. Pinnell,
BY
ATTORNEY.

No. 774,197. PATENTED NOV. 8, 1904.
J. S. PINNELL.
PUZZLE.
APPLICATION FILED OCT. 9, 1902.
NO MODEL. 2 SHEETS—SHEET 2.
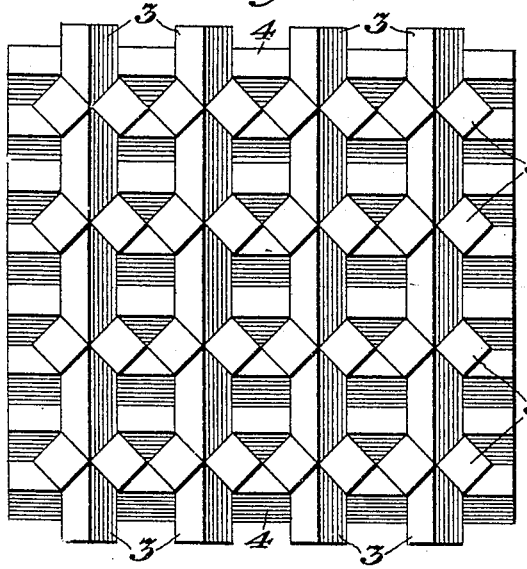
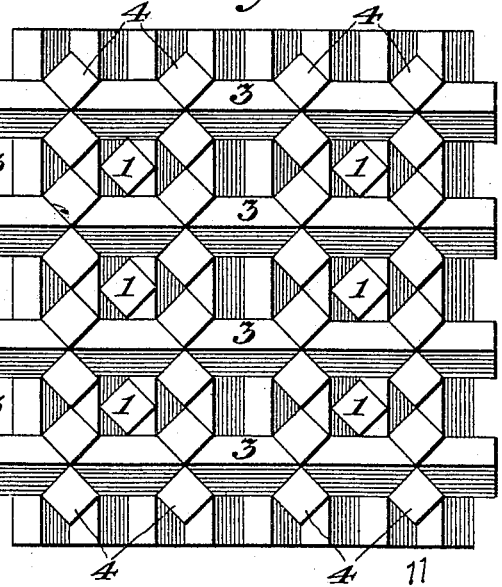
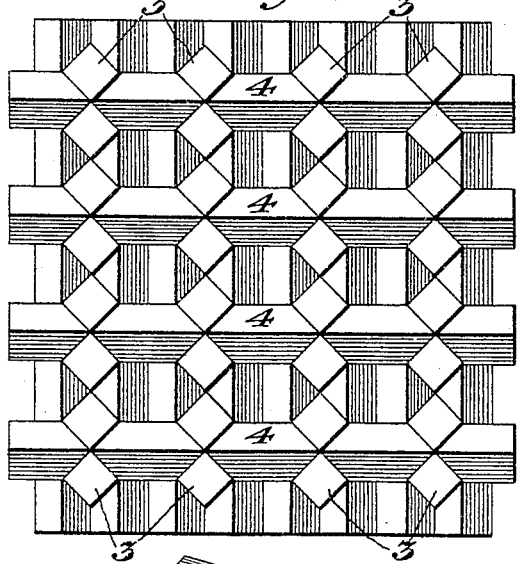
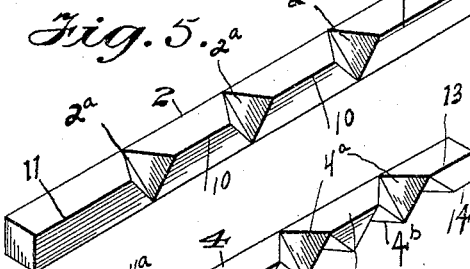
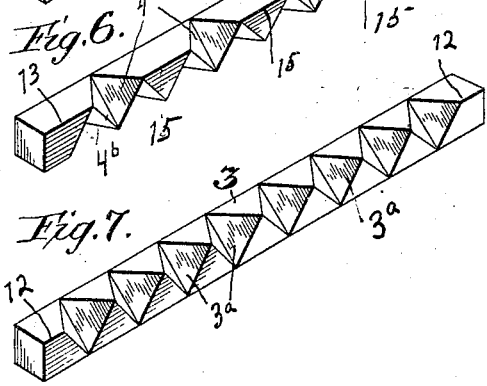
Witnesses
Chas. F. Clagett
J. M. Horton
Inventor
John S. Pinnell
By his Attorney, No. 774,197.                                                    Patented November 8, 1904.

UNITED STATES PATENT OFFICE.

JOHN S. PINNELL, OF CROSSVILLE, TENNESSEE.

PUZZLE.

SPECIFICATION forming part of Letters Patent No. 774,197, dated November 8, 1904.

Application filed October 9, 1902. Serial No. 126,416. (No model.)

*To all whom it may concern:*

Be it known that I, JOHN S. PINNELL, a citizen of the United States, residing at Crossville, in the county of Cumberland and State of Tennessee, have invented certain new and useful Improvements in Puzzles, of which the following is a specification.

My invention relates to puzzles.

It has for its object to provide a puzzle comprising a cubical block made up of a plurality of individual oblong rectangular notched and plain blocks.

It has for a further object to provide a block of the character described requiring skill, patience, and ingenuity to place the individual blocks together to form the cubical block, thereby serving as an amusement and pastime.

In the drawings, Figure 1 is a perspective view of the cubical block. Figs. 2, 3, and 4 are elevations looking at three faces of the cubical block. Figs. 5, 6, 7, and 8 are detail perspective views of the individual blocks which are placed together to form the cubical block.

Corresponding parts in all the figures are denoted by the same reference characters.

Referring to the drawings, 1 designates individual oblong rectangular blocks the vertices of the angles of which are continuous and uninterrupted; 2, individual oblong rectangular blocks each having notches $2^a$ cut in the vertex of one angle, leaving a part 10 of its vertex intermediate each notch and a part 11 at the ends; 3, individual oblong rectangular blocks each having notches $3^a$ cut in the vortex of one of its angles, leaving a part 12 of its vertex at each end and forming an uninterrupted series of diamond-shaped projections between said ends; 4, individual oblong rectangular blocks each having notches $4^b$ cut in the vertex of one angle, leaving a part 13 of the vertex at each end and forming an uninterrupted series of diamond-shaped projections between said ends and notches $4^a$ cut in the vertex of another angle thereof, leaving a part 14 of the vertex at each end and a part 15 of its vertex between said notches.

The cubical block, which is constructed of the notched and plain blocks above described in detail, comprises four horizontal superposed series of blocks 3, the blocks of each series arranged side by side, so that the vertices of the angles having the notches $3^a$ will contact and the notches register to form vertical holes; four vertical series of blocks 4, the blocks of each series arranged one above the other, so that the notches $4^a$ will engage alternate diamond-shaped projections of the blocks 3 between the notches $3^a$ and the notches $4^b$ register with the notches $3^a$ in the blocks 3, two of said blocks 4 being interposed between each series of blocks 3 and one located on each outside series at the points mentioned; vertical blocks 3 located in the vertical holes in the ends of the horizontal series of blocks 3 outside the two end vertical series of blocks 4, the notches in the vertices of the angles of said vertical blocks 3 engaging the vertices of the angles of the end blocks 4, and vertical blocks 3 located in the vertical holes in the series of blocks 3 intermediate the two middle vertical series of blocks 4, the notches in the vertices of the angles also engaging the vertices of the angles of the blocks 4; vertical blocks 2 located in the remaining vertical holes in the series of blocks 3 intermediate the two middle vertical series and the two outside vertical series of blocks 4, and the vertices of the angles having the notches $2^a$ contacting and the notches registering to form horizontal holes, and horizontal blocks 1 located in the horizontal holes formed by the notches of the vertical blocks 2. It will therefore be understood that to form this cubical block six blocks 1, sixteen blocks 2, thirty-two blocks 3, and forty-eight blocks 4 are employed and that the blocks 2 form the key-blocks.

I do not desire to be understood as limiting myself to the details of construction and arrangement as herein described and illustrated, as it is manifest that variations and modifications may be made in the features of construction and arrangement in the adaption of the device to various conditions of use without departing from the spirit and scope of my invention and improvements. I therefore reserve the right to all such variation and modification as properly fall within the scope of my invention and the terms of the following claim.

Having thus described my invention, I claim and desire to secure by Letters Patent—

A puzzle comprising a cubical block formed of a plurality of rectangular blocks the vertices of the angles of each of which are uninterrupted, a plurality of rectangular blocks the vertex of one angle of each of which is interrupted at intervals by notches leaving portions of the vertex between said notches and at the ends of the block undisturbed, a plurality of rectangular blocks the vertex of one angle of each of which is interrupted by notches leaving portions of the vertex at the ends of the block undisturbed and a plurality of rectangular blocks the vertex of one angle of each of which is interrupted at intervals by notches leaving portions of the vertex between said notches and at the ends of the block undisturbed and the vertex of another angle of each of which is interrupted by notches leaving portions of the vertex of the block at the ends undisturbed, substantially as described.

In testimony whereof I have signed my name in the presence of the subscribing witnesses.

JOHN S. PINNELL.

Witnesses:
E. Vance Hinch,
White Frost.